United States Patent [19]
Gregory

[11] Patent Number: 4,869,021
[45] Date of Patent: Sep. 26, 1989

[54] THROUGH-DOOR VIEWING DEVICE

[76] Inventor: John E. Gregory, 22210 Victory Blvd., #D320, Woodland Hills, Calif. 91367

[21] Appl. No.: 305,918

[22] Filed: Feb. 1, 1989

[51] Int. Cl.⁴ .............................................. E06B 7/28
[52] U.S. Cl. ..................................... 49/171; 350/319
[58] Field of Search ........................... 49/171; 350/319; 220/82 A

[56]  References Cited
U.S. PATENT DOCUMENTS

| | | | |
|---|---|---|---|
| 2,489,060 | 11/1949 | Tappe | 49/171 X |
| 2,491,758 | 12/1949 | Nichols et al. | 49/171 X |
| 2,638,810 | 5/1953 | Berleme | 49/171 X |
| 3,973,835 | 8/1976 | Miyakawa et al. | 350/319 |
| 4,561,116 | 12/1985 | Neyret | 49/171 X |

Primary Examiner—Philip C. Kannan

[57] ABSTRACT

An improved through-door viewing device comprising a generally rectangular telescope, a lens mounted in one end of said telescope, an eyepiece mounted in the opposite end of said telescope, a window formed in one side of said telescope adjacent said one end, an escutcheon mounting said telescope in a door for sliding and rotating motion within said escutcheon, a mirror mounted within said telescope and pivotable between a first retracted position lying substantially parallel to the wall of said telescope out of the line of vision through said telescope and a second extended position lying across said line of vision in position to direct vision from said eyepiece through said window of said telescope, flange means responsive to inward sliding of said telescope to move said mirror to said retracted position, and spring means responsive to sliding of said telescope outwardly to urge said mirror to said extended position.

5 Claims, 2 Drawing Sheets

THROUGH-DOOR VIEWING DEVICE

BACKGROUND

1. Field of Invention

This invention relates to security devices and is particularly directed to through-door viewing devices for permitting a person inside a house, apartment or the like to observe persons or things outside the door without the necessity of opening the door.

2. Prior Art

In recent years, crimes such as burglary, mugging, rape and even murder have become increasingly common. Many people have installed multiple locks and dead bolts on their doors to prevent break-ins. Unfortunately, criminals have responded to this by employing numerous subterfuges, such as claiming to be delivery men, telegraph boys or the like, to persuade a potential victim to open their door and, hence, to allow the criminal to circumvent the locks and dead bolts. Accordingly, several prior art devices have been proposed to enable a person to see the area outside the door without the necessity of opening the door. A search in the U.S. Patent Office has revealed the following patents:

| U.S. Pat. No. | INVENTOR | ISSUE DATE |
| --- | --- | --- |
| 2,489,060 | F. G. Tappe | Nov. 22, 1949 |
| 2,491,758 | A. Nichols et al | Dec. 20, 1949 |
| 2,638,810 | G. R. Berleme | May 19, 1953 |
| 4,561,116 | G. Neyret | Dec. 24, 1985 |

Each of these references relates to through-door viewing devices. However, none of the prior art devices provides significant peripheral vision for the viewer. Thus, if the person seeking entrance is not standing directly in front of the door, the potential victim cannot see them and may proceed to open the door. So-called "fish eye" or wide angle lenses have been employed in some through-door viewing devices to attempt to solve this problem. However, these lenses produce considerable distortion, especially in areas approaching 90° to the viewing axis, and, hence, provide little, if any, help in observing and identifying a person seeking entrance. Thus, none of the prior art through-door viewing devices have been entirely satisfactory.

BRIEF SUMMARY AND OBJECTS OF INVENTION

These disadvantages of prior art through-door viewing devices are overcome with the present invention and improved through-door viewing devices are provided which enable the person inside to view the area directly in front of the door and, in addition, permit an undistorted 360° view of the surrounding area without the necessity of opening the door.

The advantages of the present invention are preferably attained by providing an improved through-door viewing device comprising a generally rectangular telescope, a lens mounted in one end of said telescope, an eyepiece mounted in the opposite end of said telescope, a window formed in one side of said telescope adjacent said one end, an escutcheon mounting said telescope in a door for sliding and rotating motion within said escutcheon, a mirror mounted within said telescope and pivotable between a first retracted position lying substantially parallel to the wall of said telescope out of the line of vision through said telescope and a second extended position lying across said line of vision in position to direct vision from said eyepiece through said window of said telescope, flange means responsive to inward sliding of said telescope to move said mirror to said retracted position, and spring means responsive to sliding of said telescope outwardly to urge said mirror to said extended position.

Accordingly, it is an object of the present invention to provide improved through-door viewing devices.

Another object of the present invention is to provide improved through-door viewing devices which permit viewing the area directly in front of the door and also provide an undistorted 360° view of the area around the door.

A further object of the present invention is to provide improved through-door viewing devices which provide an undistorted 360° view of the area about a door without the necessity of opening the door.

A specific object of the present invention is to provide an improved through-door viewing device comprising a generally rectangular telescope, a lens mounted in one end of said telescope, an eyepiece mounted in the opposite end of said telescope, a window formed in one side of said telescope adjacent said one end, an escutcheon mounting said telescope in a door for sliding and rotating motion within said escutcheon, a mirror mounted within said telescope and pivotable between a first retracted position lying substantially parallel to the wall of said telescope out of the line of vision through said telescope and a second extended position lying across said line of vision in position to direct vision from said eyepiece through said window of said telescope, flange means responsive to inward sliding of said telescope to move said mirror to said retracted position, and spring means responsive to sliding of said telescope outwardly to urge said mirror to said extended position.

These and other objects and features of the present invention will be apparent from the following detailed description, wherein reference is made to the figures of the accompanying drawings.

DETAILED DESCRIPTION OF THE INVENTION

Figure 1:
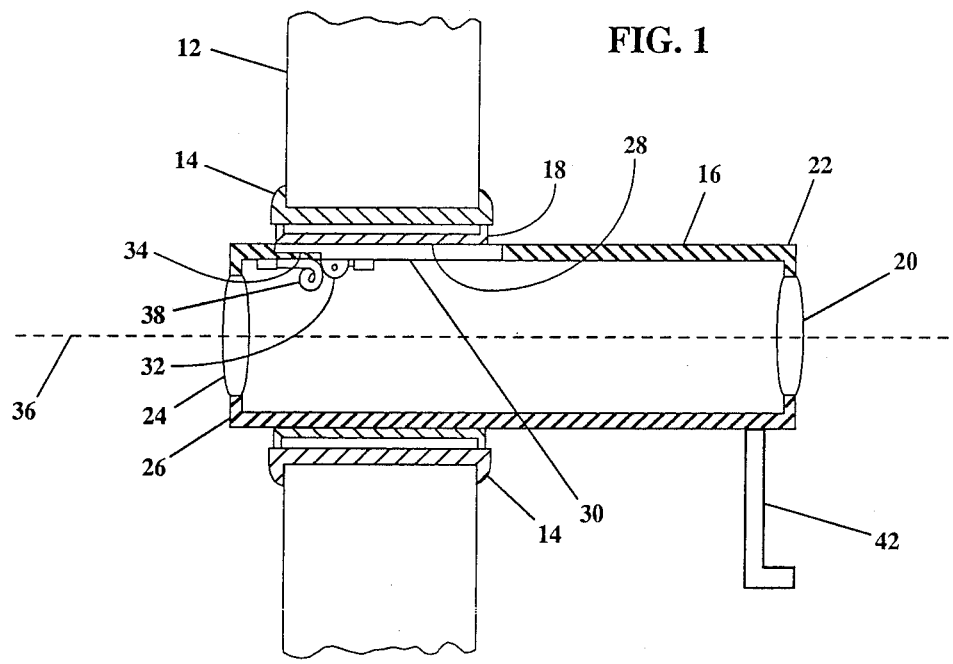
FIG. 1 is a vertical section through a through-door viewing device embodying the present invention with the telescope retracted.
Figure 2:
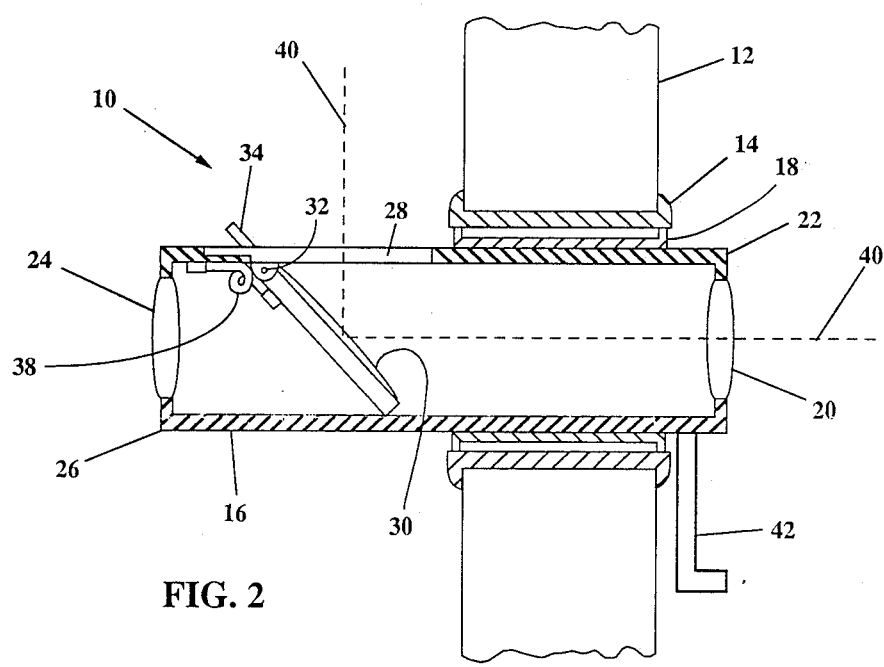
FIG. 2 is a vertical section through the through-door viewing device of FIG. 1 with the telescope extended.
Figure 3:
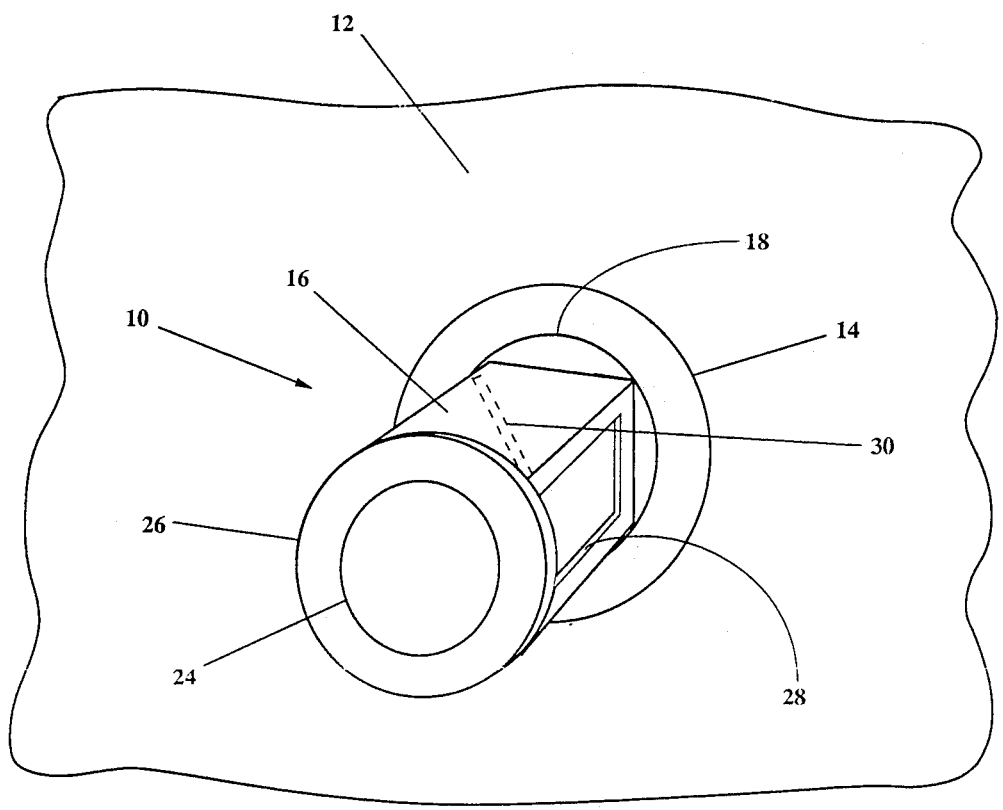
FIG. 3 is an isometric view of the outside end of the through-door viewing device of FIG. 1, with the window rotated to one side.

In that form of the present invention chosen for purposes of illustration in the drawings, FIG. 1 shows a through-door viewing device, indicated generally at 10, mounted in a door 12 by means of a suitable escutcheon 14. The viewing device 10 comprises a generally rectangular telescope or viewing tube 16 which is rotatably mounted in the escutcheon 14 by suitable mounting means 18 and an eyepiece 20 mounted on the inner end 22 of the viewing tube 16 and a wide angle lens 24 mounted at the outer end 26 of the viewing tube 16. As best seen in FIG. 3, a window 28 is formed in one wall of the viewing tube 16 and a convex mirror 30 is pivotally mounted within the viewing tube 16 adjacent the window 28 by suitable means, such as hinge 32. The mirror 30 is provided with an upwardly projecting tab 34 which, when the viewing tube 16 is in its retracted position, as seen in FIG. 1, engages the mounting means 18 and forces the mirror 30 to lie substantially parallel to the wall of the viewing tube 16, out of the line of vision, indicated by broken line 36, of a person looking through the eyepiece 20 and out the lens 24. When the viewing tube 16 is moved to its extended position, as seen in FIGS. 2 and 3, the mirror 30 is urged by suitable means, such as spring 38 to an extended position, as seen in FIG. 2, wherein the mirror 30 extends across the interior of the viewing tube 16 at approximately a 45° angle so as to permit a person looking into the eyepiece 20 to see through the window 28, as indicated by broken line 40, to observe the area at right angles to the axis of the viewing tube 16. A crank 42 is secured to the viewing tube 16 adjacent the inner end 22 to facilitate rotation of the viewing tube 16 about its axis to permit viewing a 360° area about the viewing tube 16. Moreover, because the mirror 30 is convex, the field of view provided by the mirror 30 will be quite substantial.

In use, the viewing tube 16 will normally be maintained in its retracted position, as seen in FIG. 1. Thus, when the person inside the door 12 desires to observe the area outside the door 12, they, first, look through the eyepiece 20 and lens 24, along the line of vision 36, to observe the area forward of the door 12. With the viewing tube 16 in its retracted position, tab 34 of mirror 30 engages the inner surface of the mounting means 18 and forces the mirror 30 to lie substantially parallel to the wall of the viewing tube 16 where it does not interfere with the line of vision 36. To obtain a peripheral view of the area outside the door 12, the viewer pushes the viewing tube 16 to its extended position, as seen in FIGS. 2 and 3. As this is done, spring 38 urges the mirror 30 to its extended position, lying approximately 45° to the axis of the viewing tube 16, which permits the viewer to observe through the window 28, along line of vision 40. By rotating the crank 42, the viewer can rotate the viewing tube 16 and, hence, can obtain a 360° view of the area outside the door 12. Thus, without opening the door 12, the viewer can ascertain whether anyone is in front of the door or in the general vicinity about the door.

Obviously numerous variations and modifications can be made without departing from the spirit of the present invention. Therefore, it should be clearly understood that the form of the present invention described above and shown in the figures of the accompanying drawings is illustrative only and is not intended to limit the scope of the present invention.

What is claimed is:

1. A through-door viewing device comprising:

a generally rectangular telescope having a lens mounted in one end of said telescope, an eyepiece mounted in the opposite end of said telescope, and a window formed in one side of said telescope adjacent said one end, an escutcheon mounting said telescope in a door, mounting means mounting said telescope for sliding and rotating motion within said escutcheon, a mirror mounted within said telescope and pivotable between a first retracted position lying substantially parallel to the wall of said telescope out of the line of vision through said eyepiece and said lens and a second extended position lying across said line of vision in position to direct vision from said eyepiece through said window of said telescope, flange means responsive to inward sliding of said telescope to move said mirror to said retracted position, and spring means responsive to sliding of said telescope outwardly to urge said mirror to said extended position.

2. The device of claim 1 further comprising:

crank means secured to said telescope for facilitating rotation of said telescope to permit viewing a 360° area about said telescope.

3. The device of claim 1 wherein:

said mirror is a convex mirror.

4. The device of claim 1 wherein:

said lens is a wide angle lens.

5. The device of claim 1 wherein:

said extended position of said mirror forms an angle of approximately 45° with said line of vision.

* * * * *